United States Patent
Vissa (10) Patent No.: US 9,800,707 B2
(45) Date of Patent: Oct. 24, 2017

(54) MOBILE DEVICE WITH PUBLIC ANNOUNCEMENT RECEPTION WHILE USING A HEADSET ACCESSORY

(71) Applicant: Motorola Mobility LLC, Chicago, IL (US)

(72) Inventor: Sudhir C Vissa, Bensenville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/955,194

(22) Filed: Dec. 1, 2015

(65) Prior Publication Data

US 2017/0155751 A1 Jun. 1, 2017

(51) Int. Cl.
| | |
|---|---|
| *H04W 48/00* | (2009.01) |
| *H04W 48/04* | (2009.01) |
| *H04M 1/725* | (2006.01) |
| *H04W 76/02* | (2009.01) |
| *H04W 4/20* | (2009.01) |

(52) U.S. Cl.
CPC ......... *H04M 1/72527* (2013.01); *H04W 4/20* (2013.01); *H04W 76/021* (2013.01)

(58) Field of Classification Search
CPC ..... H04W 48/20; H04W 48/16; H04W 48/04; H04W 48/00; H04W 48/14; H04W 48/12
See application file for complete search history.

(56) References Cited

U.S. PATENT DOCUMENTS

| | | | | |
|---|---|---|---|---|
| 6,714,826 | B1 * | 3/2004 | Curley | H04H 60/04 700/94 |
| 2004/0209569 | A1 * | 10/2004 | Heinonen | H04M 1/6066 455/41.2 |
| 2011/0319020 | A1 * | 12/2011 | Desai | H04L 63/02 455/41.2 |
| 2013/0065637 | A1 * | 3/2013 | Tasker | H04M 1/6066 455/553.1 |
| 2014/0064511 | A1 * | 3/2014 | Desai | H04R 1/1041 381/74 |
| 2014/0073288 | A1 * | 3/2014 | Velasco | H04W 4/02 455/411 |
| 2014/0269654 | A1 * | 9/2014 | Canpolat | H04W 48/20 370/338 |
| 2015/0031322 | A1 | 1/2015 | Twina et al. | |
| 2015/0127710 | A1 | 5/2015 | Ady et al. | |

* cited by examiner

*Primary Examiner* — Wesley Kim
*Assistant Examiner* — Dong-Chang Shiue
(74) *Attorney, Agent, or Firm* — Cygan Law Offices P.C.; Joseph T. Cygan (57) ABSTRACT

A mobile device detects use of a headset accessory and, in response, scans for wireless local area network (WLAN) access points that provide a public announcement service. The mobile device will connect with a WLAN access point and proceed to receive public announcement audio which is sent over the headset accessory. Any other audio being played over the headset will either be paused, or reduced in volume while the public announcement audio is played. Alternatively, if no WLAN access point is available, the mobile device can locate a low energy wireless protocol device, and receive public announcements via text message. The WLAN access point and low energy wireless protocol connections are disconnected if the headset accessory is disconnected or no longer in use.

19 Claims, 11 Drawing Sheets

MOBILE DEVICE WITH PUBLIC ANNOUNCEMENT RECEPTION WHILE USING A HEADSET ACCESSORY

FIELD OF THE DISCLOSURE

The present disclosure relates generally to wireless communication and more particularly to methods, apparatuses and systems directed to receiving public announcements.

BACKGROUND

Almost all mobile device users have had the experience of being in a noisy environment such as a train station, airport or public gathering and being unable to hear a phone call. An additional experience that most mobile device users have had is being unable to hear public announcements in a noisy environment. In some cases, public announcements become garbled due to audio equipment issues, surrounding ambient noise, or even the user's hearing. Because of these issues, public announcements in train stations and airports are sometimes missed by the intended audience, which can cause passengers to miss their train or flight. In other public venues, a safety hazard may occur if people in the crowd do not hear emergency messages that are being broadcast.

Also at railway track crossings, mobile device users that are listening to entertainment audio such as songs or radio broadcasts using a headset accessory often become unaware of their surroundings and may not keep in mind that a train approaching, creating an extremely dangerous situation.

DETAILED DESCRIPTION

Briefly, a disclosed mobile device detects that a headset accessory is being used and, in response, locates a wireless local area network (WLAN) access point, or a low energy wireless protocol device, that has a service of public announcements. The mobile device then connects with the WLAN access point such that public announcements are sent over the headset accessory when received, interrupting any other audio to which the user may be listening. The mobile device is also operative to receive a public announcement service from a low energy wireless protocol device, to receive the same public announcements. The WLAN access point and low energy wireless protocol connection are disconnected if the user disconnects the headset accessory. Examples of public announcements may include, but are not limited to, voice announcements made in train or bus stations or airports, as well as information provided by signs, banners, sound, music, video, combinations thereof, and the like. For example train stations usually have voice public announcements when a train is approaching the station. In another example, airports usually have voice public announcements when a plane is ready for passenger boarding. In other words a "public announcement" is an announcement made over a public address system and broadcast over one or more speakers of the public address system. The public announcement may be made by a person speaking over the public address system or may be an automated message that is played over the public address system using a text-to-voice converter used to simulate a human speaker.

One aspect of the present disclosure is a method that includes determining, at a mobile device, that a headset is connected and, in response, obtaining a list of access points providing a public announcement service based on location of the mobile device. The list of access points includes identification and connection information for each access point in the list. Using this information, the mobile device may then scan for access points using the access point identification information and establish a connection. The mobile device may then receive a public announcement via the public announcement service provided by the connected access point. The identification and connection information includes an SSID, passkey and security type for each WLAN access point in the list. The public announcement service may a generic advertisement service (GAS) provided by a WLAN access point. In some embodiments, the mobile device may also obtain a list of low energy wireless protocol devices including identification and connection information for each low energy wireless protocol device in the list.

The method may further include providing an audio stream of the public announcement over the headset. In one embodiment, the method may proceed by pausing a first audio stream being sent to the headset in response to receiving the public announcement, providing a second audio stream of the public announcement over the headset, and continuing the first audio stream after completion of the second audio stream. In another embodiment, the method may proceed by providing a second audio stream of the public announcement over the headset while a first audio stream is playing. The second audio stream may be played at a higher volume level than the first audio stream. Alternatively, the volume level of the first audio stream may be reduced prior to playing the second audio stream.

Another aspect of the present disclosure is a mobile device that includes at least one transceiver, and a processor, operatively coupled to the transceiver. The processor is operative to determine that a headset is connected to the mobile device and, in response, obtain a list of access points providing a public announcement service based on location of the mobile device. The list of access points includes identification and connection information for each access point in the list. The processor is operative to scan via the transceiver, for access points using the access point identification information from the list of access points, and to establish a connection with an access points found during the scan. The processor is operative to receive a public announcement via the public announcement service provided by the connected access point.

In some embodiments, the mobile device further includes a controller, operatively coupled to the processor, and operative to provide a link layer and a physical layer of a low energy wireless protocol. In such embodiments, the processor is further operative to obtain a list of low energy wireless protocol devices including identification and connection information for each low energy wireless protocol device in the list. The mobile device also includes audio equipment, operatively coupled to the processor. The audio equipment is operative to provide coupling with an external headset where the processor is further operative to provide an audio stream of the public announcement over the headset.

The processor is further operative to pause a first audio stream being sent to the headset in response to receiving the public announcement, provide a second audio stream of the public announcement over the headset, and continue the first audio stream after completion of the second audio stream. In some embodiments, the processor may provide a second audio stream of the public announcement over the headset while a first audio stream is playing. In other embodiments, processor may provide the second audio stream at a higher volume level than the first audio stream. In yet other embodiments, the processor may reduce the volume level of the first audio stream and play the second audio stream.

The mobile device may further include a headset jack, operatively coupled to the audio equipment, or may include a controller operatively coupled to an antenna and to the audio equipment, where the controller is operative to connect wirelessly with a headset accessory. Another aspect of the present disclosure is a system that includes the mobile device, and a headset operatively coupled to the mobile device.

Figure 1:
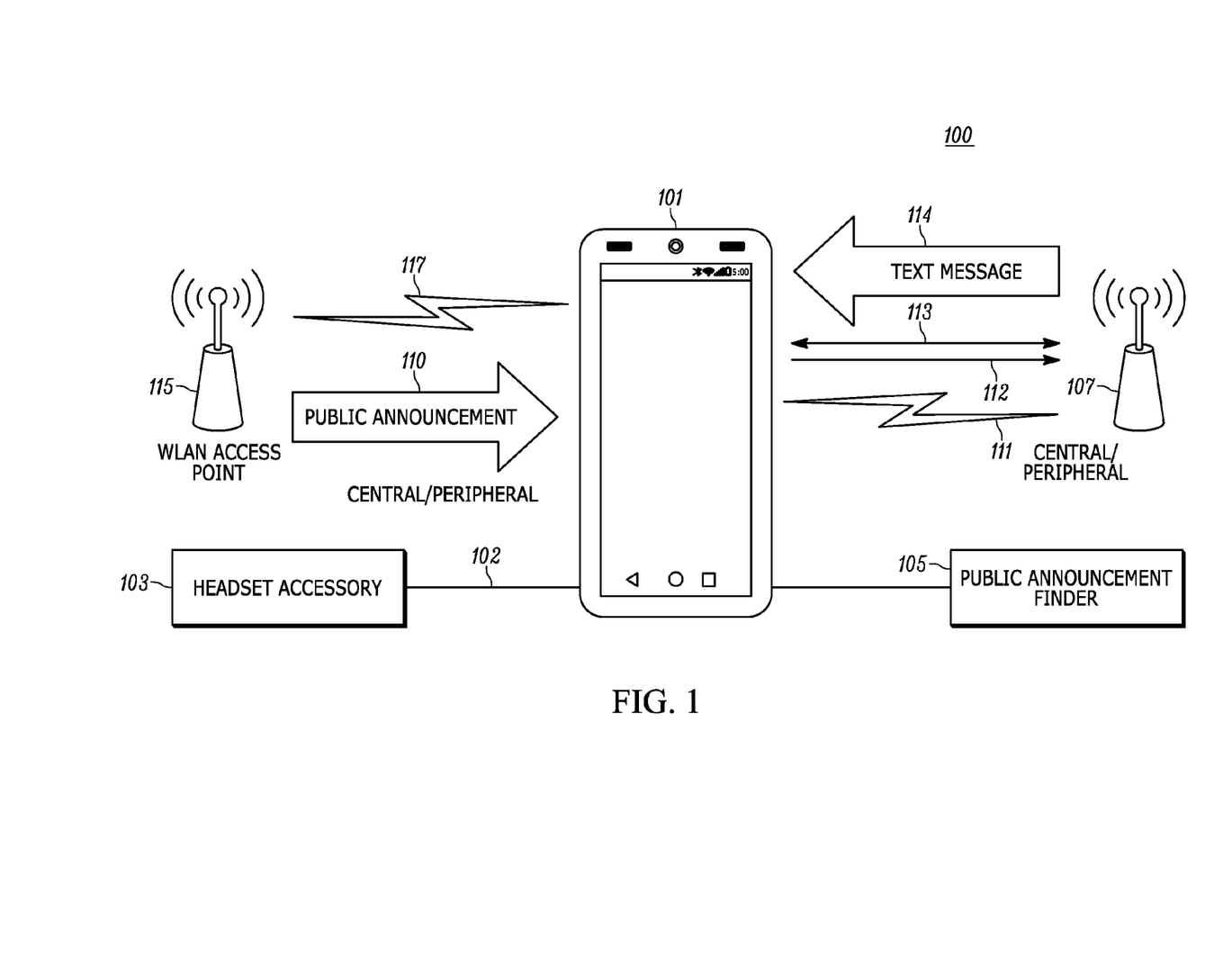
FIG. 1 is a diagram showing a mobile device operative to communicate with a wireless local area network (WLAN) access point, or with a device using a low energy wireless protocol, to obtain a public announcement service.

Turning now to the drawings wherein like numerals represent like components, FIG. 1 illustrates a mobile device 101 that can be connected to a headset accessory 103. The mobile device 101 may be a mobile phone, a smartphone, a personal digital assistant, a portable media playback device, a handheld tablet, and the like, or may be any type of portable device capable of playing audio over headset accessory 103 and forming a wireless connection. The headset accessory 103 may be wirelessly connected to the mobile device 101, or may physically connect to a mobile device 101 headset jack via a wire 102. The headset accessory 103 may be a dual-earphone headset, or may be a single earpiece in some embodiments. The mobile device 101 includes a public announcement finder 105.

In one embodiment, if the mobile device 101 detects that the headset accessory 103 is connected to the mobile device 101, the public announcement finder 105 will obtain a list of wireless local area network (WLAN) access points that provide a public announcement service at the mobile device 101 location 100. The access point list will include connection and identification information for each access point, in other words WLAN login credentials. The mobile device 101 will use the access point list to identify a WLAN access point 115 with the public announcement service, and will establish a wireless connection 117 using the connection information. The mobile device 101 will then receive public announcements 110 over the wireless connection 117.

In an alternative embodiment, the mobile device 101 may locate a device 107 using a low energy wireless protocol 111. The low energy wireless protocol 111 may be, for example, the Bluetooth® Low Energy (hereinafter "BLE") protocol. A device having BLE capability is referred to herein as a "BLE device." The mobile device 101 may broadcast a BLE scan request to find BLE devices, such as device 107, which are listening to public announcements. The device 107 may operate in the role of peripheral mode or central mode, or may operate in both modes in some embodiments. In one example embodiment, if the device 107 is operating as a central mode device, the mobile device 101 may send an invite message 112 to the device 107 using the low energy wireless protocol 111. The mobile device 101 may then receive a public announcement as a text message 114 over the low energy wireless protocol 111. In some embodiments, each device may act in both the roles of central and peripheral. In some embodiments, the mobile device 101 and device 107 may form a connection 113 in which one acts as a central device and the other acts as a peripheral device.

Figure 2:
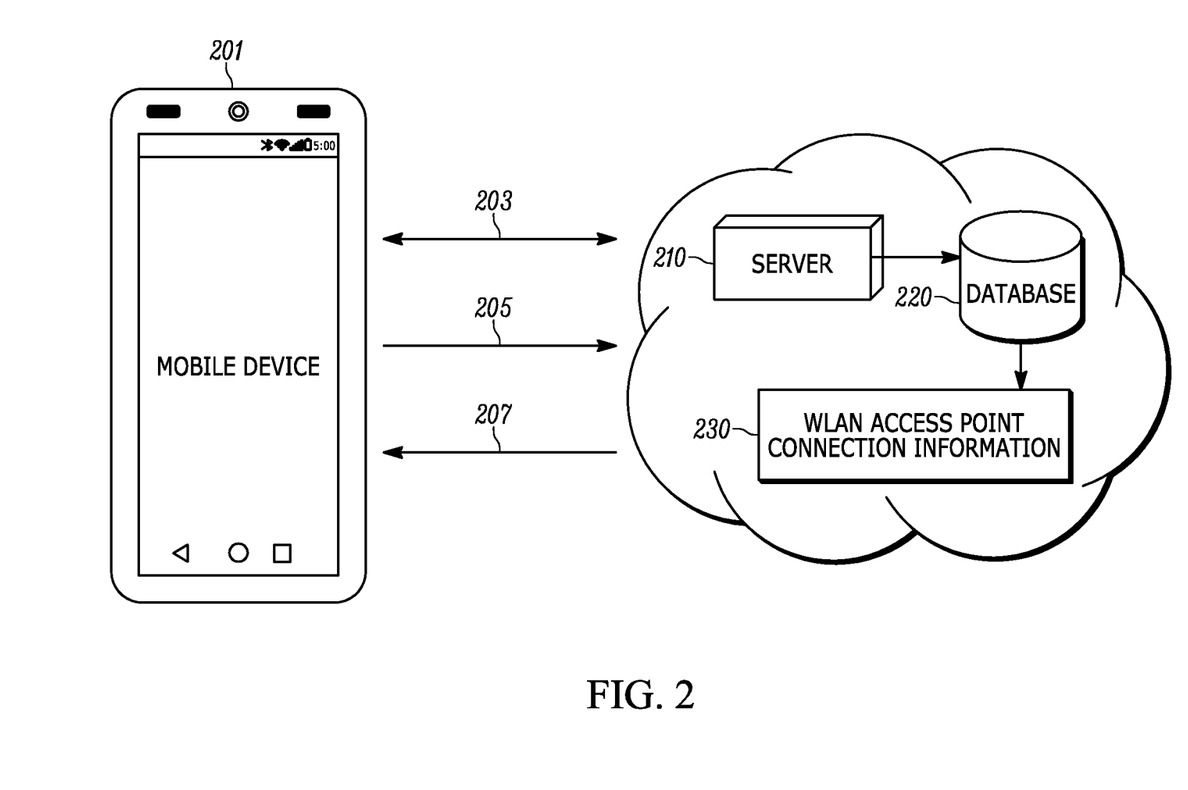
FIG. 2 is a diagram showing a mobile device operative to connect with a server in order to obtain a list of access points that provide a public announcement service, including access point identification and connection information (i.e. login credentials), at the mobile device location, in accordance with an embodiment.

FIG. 2 shows how a mobile device obtains a WLAN access point list and WLAN login credentials in accordance with various embodiments. The mobile device 201 includes the public announcement finder 105 illustrated in FIG. 1. The mobile device 201 may establish an Internet Protocol (IP) connection and communicate with a server 210 using a either a wide area network (WAN) wireless protocol or WLAN connection using a known WLAN access point. The server 210 either includes, or is operatively couple with, a database 220 that contains WLAN connection and identification information of WLAN access points that provide public announcement services at various locations.

In the example embodiment illustrated in FIG. 2, the mobile device 201 initiates an IP connection 203 with the server 210, and sends location information 205 to the server 210 to obtain a list of WLAN access points 207, including WLAN login credentials. The server 210 provides the list of WLAN access points 207 based on the location information 205 of the mobile device 201. In other words, the WLAN access points identified in the list are accessible to the mobile device 201 at its location such that the mobile device 201 can receive public announcements from at least one of the access points. The WLAN login credentials provided in the list include WLAN access point identification and connection information such as, but not limited to, an SSID, passkey and security type, etc., for each WLAN access point in the list.

The mobile device 201 public announcement finder 105 may communicate with mobile device 201 internal Global Positioning System (GPS) hardware to obtain the location information 205 sent to the server 210. The mobile device may, in some embodiments, continuously monitor for location changes in the background and may send occasional location updates to the server 210. If the mobile device 201 is present at a location where public announcements are relevant (such as an airport, train station, bus station, restaurant waiting area, etc.) then the server 210 may send a new or updated WLAN access point list. The mobile device 201 may also obtain its location information from a WAN or known WLAN or from Internet information.

Figure 3:
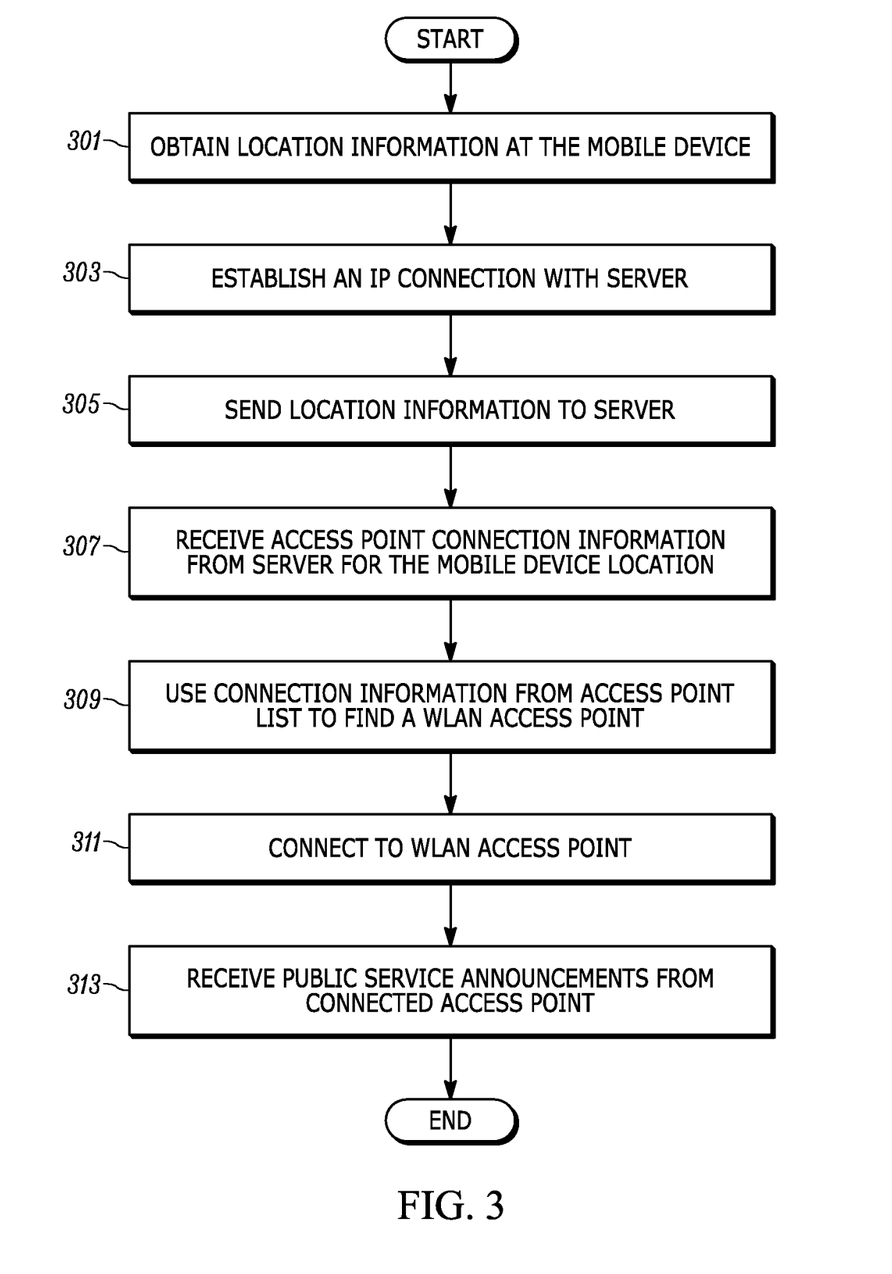
FIG. 3 is a flowchart of an example method of operation in mobile device in accordance with an embodiment.

A method of operation of the mobile device 201 shown in FIG. 2 for obtaining the list of WLAN access points 207 and connection information from the server 210 is best understood in light of the flowchart of FIG. 3. The process begins and in operation block 301, the mobile device 201 obtains locations information. Location information may be obtained from GPS hardware or via a wireless network or from Internet information. In operation block 303, an IP connection 203 is established with the server 210. In operation block 305, the mobile device 201 sends location information 205 to the server 210. In response, at operation block 307, the server 210 sends the list of WLAN access points 207 including WLAN login credentials to the mobile device 201. In operation block 309, the mobile device 201 uses the connection information from the access point list 207 to find a WLAN access point. In operation block 311, the mobile device 201 connects to the WLAN access point. In operation block 313, the mobile device 201 receives public service announcements from the connected access point.

Figure 4:
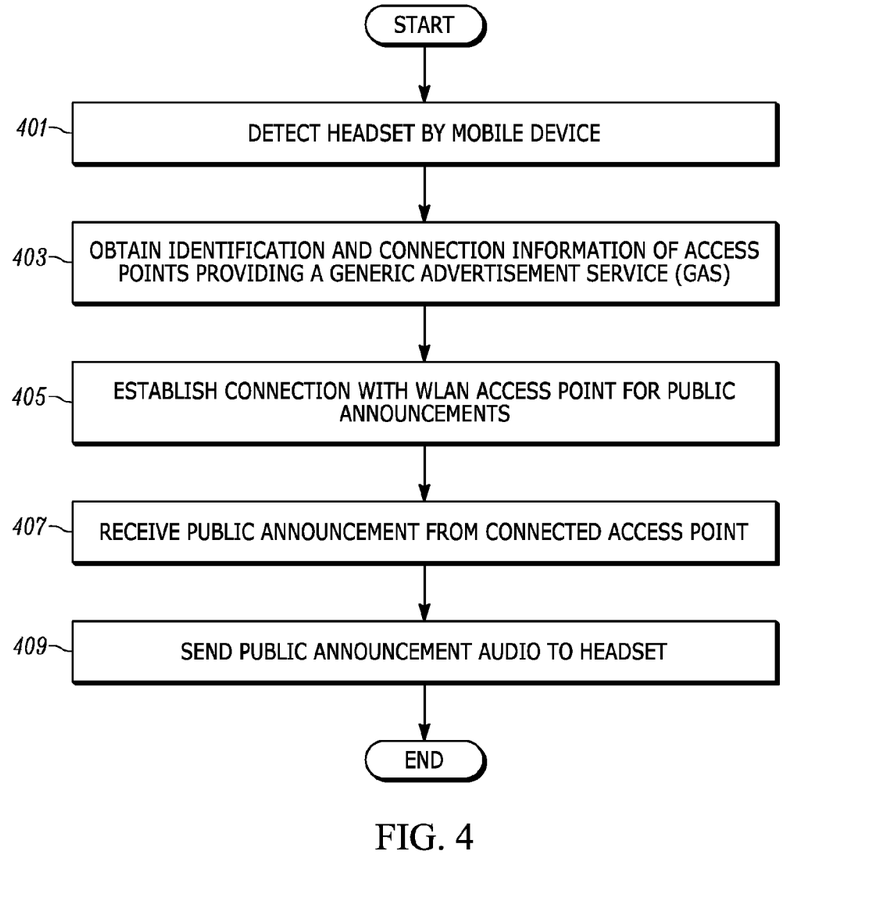
FIG. 4 is a flowchart of an example method of operation in a mobile device in accordance with an embodiment.

Another method of operation of the mobile device is illustrated in the flowchart of FIG. 4. The process begins and in operation block 401, the mobile device detects that a headset accessory has been connected. The headset accessory may have a wireless or wired connection with the mobile device. In operation block 403, the mobile device obtains a list of access points with identification and connection information for access points providing a generic advertisement service (GAS). In operation block 405, the mobile device establishes a connection with a WLAN access point that provides the GAS service (i.e. that provides public announcement service). In operation block 407, the mobile device receives public announcements from the connected access point. In operation block 409, the mobile device sends audio of any public announcements to the headset accessory. The method of operation shown in FIG. 4 continues until the mobile device leaves the location associated with the public address system being monitored. At that point, the method of operation terminates as shown.

Figure 5:
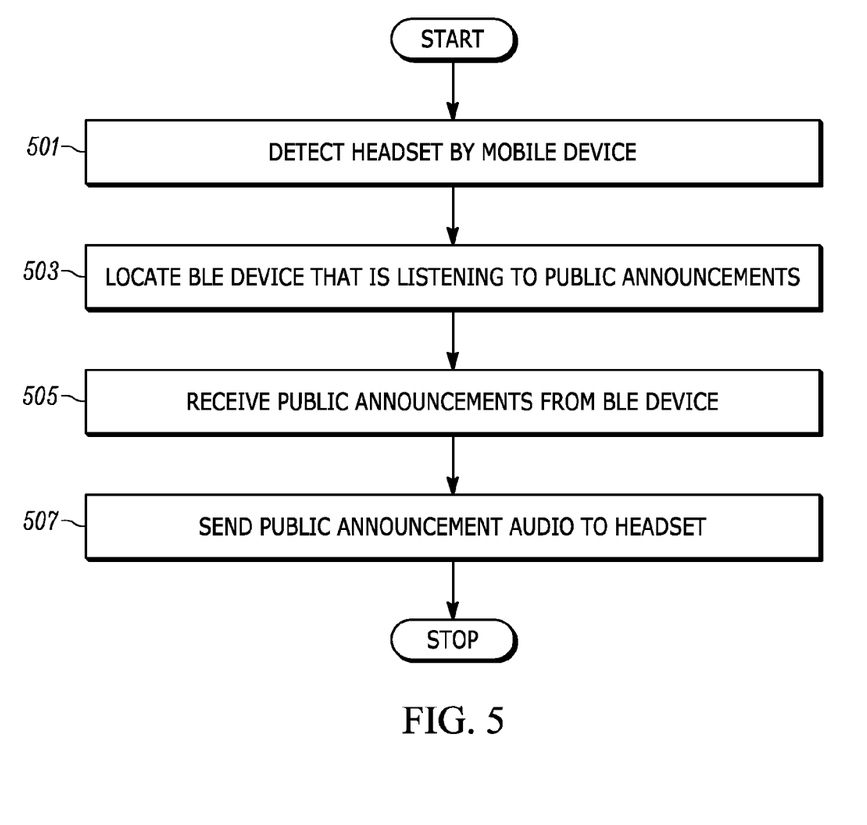
FIG. 5 is a flowchart of example method of operation in a mobile device in accordance with an embodiment.

FIG. 5 is a flowchart of another method of operation in a mobile device having a public announcement finder in accordance with an embodiment. The method of operation begins and in operation block 501, the mobile device detects a headset accessory connected wirelessly or physically via a wired connection. In operation block 503, the mobile device locates a BLE device that is listening to public announcements. In operation block 505, the mobile device receives public announcements from the BLE device. In one embodiment, the BLE device may operate in peripheral mode while in other embodiments, the BLE device may operate in central mode. At operation block 507, the mobile device sends audio of the public announcements to the headset. In some embodiments, where the public announcements are received as text messages, a text-to-voice converter in the mobile device may be used to convert the text message to the audio that is played over the headset.

Figure 6:
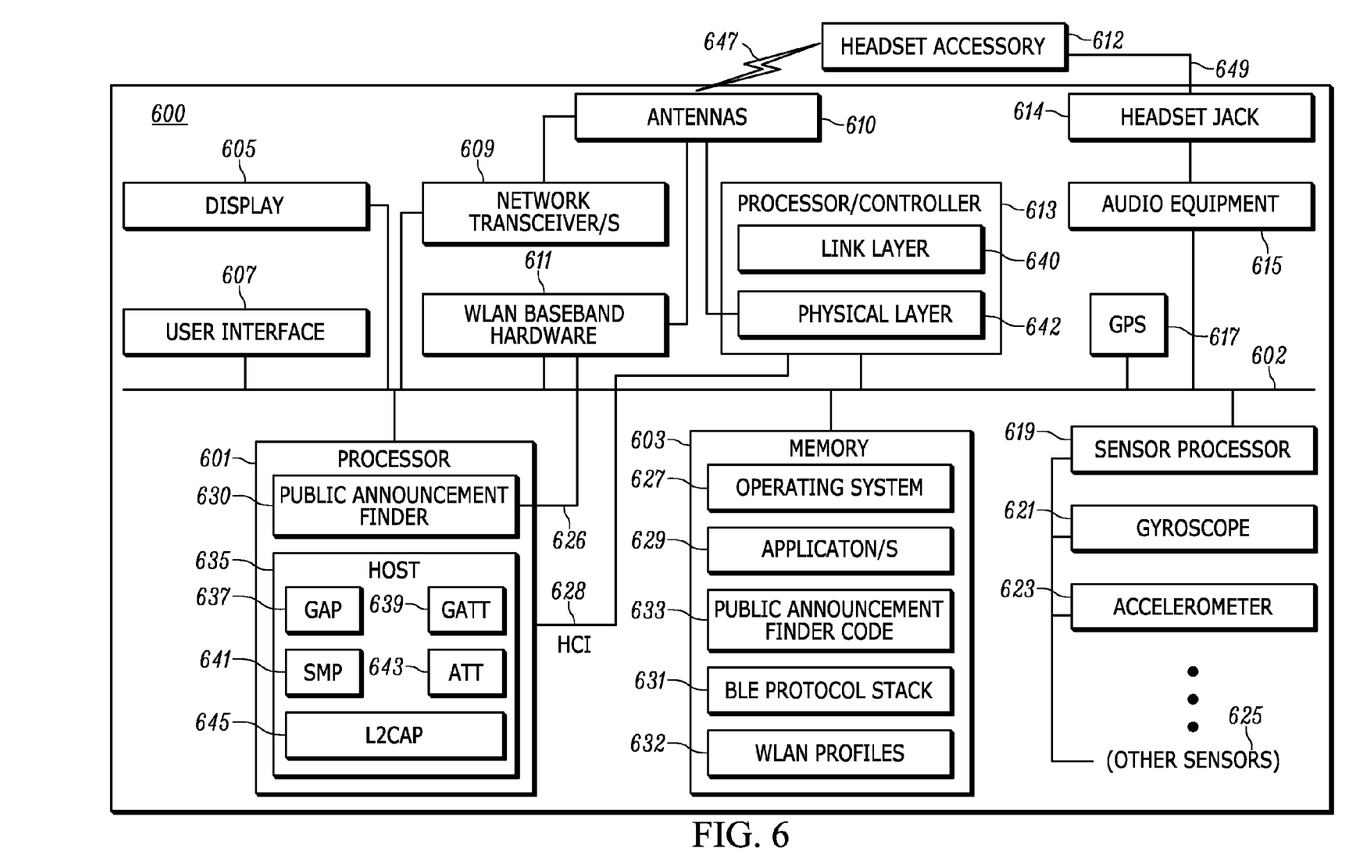
FIG. 6 is a diagram of a mobile device in accordance with an embodiment.

FIG. 6 is a diagram of a mobile device 600 in accordance with various embodiments. In accordance with the example embodiment of FIG. 6, the mobile device 600 includes at least one processor 601, display 605, user interface 607, one or more wide area network (WAN) transceivers 609 (such as, but not limited to CDMA, UMTS, GSM, LTE, etc.), WLAN baseband hardware 611, processor/controller 613, GPS hardware 617, and non-volatile, non-transitory memory 603. The mobile device 600 may include a headset jack 614 capable of connecting to a headset accessory 612 via a wire 649. Alternatively, in some embodiments the headset accessory 612 may use a wireless connection 647 to an antenna 610 of the mobile device 600 and an appropriate connection protocol such as, for example, Bluetooth®.

When the headset accessory 612 is connected to the headset jack 614, the headset accessory 612 is operatively coupled to audio equipment 615. The audio equipment 615 includes speakers, microphones and audio processing. For example, the audio equipment 615 may include, among other things, at least one microphone, at least one speaker, signal amplification, analog-to-digital conversion/digital audio sampling, echo cancellation, etc., which may be applied to one or more microphones and/or one or more speakers of the mobile device 600, including the headset accessory 612 which includes at least one speaker/earpiece and may also include a microphone.

All of the mobile device 600 components shown are operatively coupled to the processor 601 by one or more internal communication buses 602. In some embodiments, a separate sensor processor 619 monitors sensor data from various sensors including a gyroscope 621 and an accelerometer 623 as well as other sensors 625. The gyroscope 621 and accelerometer 623 may be separate or may be combined into a single integrated unit. The memory 603 is non-volatile and non-transitory and stores executable code for an operating system 627 that, when executed by the processor 601, provides an application layer (or user space), libraries (also referred to herein as "application programming interfaces" or "APIs") and a kernel. The memory 603 also stores executable code for various applications 629, such as public announcement finder code 633. The memory may also store various radio protocol stacks such as, but not limited to, BLE protocol stack 631. The processor 601 is operative to, among other things, launch and execute the operating system 627, applications 629, the public announcement finder 630, and the BLE protocol stack 631. The processor is operative to execute a text-to-voice converter application that can convert a text message to an audio stream that can be played over the speakers or over the headset accessory. The memory 603 may also store WLAN profiles 632 which may include WLAN access point identification and connection information (WLAN login credentials) received from a server based on the mobile device 600 location.

In the example embodiment illustrated in FIG. 6, the public announcement finder 630 is executed on the processor 601. The public announcement finder 630 is operative to communicate with the WLAN baseband hardware 611 to send and receive command, control and information messages 626 over the internal communication buses 602. The public announcement finder 630 is also operative to communicate with memory 603 to retrieve and utilize the WLAN profiles 632 for connecting with WLAN access points that provide public announcement service. Also, as the public announcement finder 630 receives access point lists from a server as was described above, the access point lists may be stored as WLAN profiles 632 by the public announcement finder 630. The public announcement finder 630 is also operative to communicate with GPS hardware 617 to obtain location information that is sent to the server in order to obtain location related access point lists.

The public announcement finder 630 is also operative to communicate with the BLE host in some embodiments in order to obtain public announcements from a BLE device. The BLE protocol stack 631, when executed by processor 601 includes the host layer 635. The host layer 635 includes the Generic Access Profile (GAP) 637, Generic Attribute Profile (GATT) 639, Security Manager (SMP) 641, Attribute Protocol (ATT) 643 and Logical Link Control and Adaptation Protocol (L2CAP) 645. The processor 601 also executes the host side Host Controller Interface (HCI) 628, which enables communication with the processor/controller 613. The processor/controller 613 provides the control layer including the Link Layer (LL) 640, Physical Layer (PHY) 642 and the controller side HCI of HCI 628. The Physical Layer 642 is operatively coupled to one or more antennas 610 for transmitting and receiving information. The one or more antennas 610 are also operatively coupled to one or more wide area network WAN transceivers 609.

It is to be understood that the host layer 635 and control layer (i.e. link layer 640 and physical layer 642) can be implemented in other ways that are contemplated by the present disclosure and that the example shown in FIG. 6 is only one possible implementation. For example, in some embodiments, the host layer and control layer may be implemented on a single integrated processor. In other example embodiments, the host layer and control layer may be executed on one processor, while the application layer is executed on another processor and communicates with the host layer using a proprietary protocol rather than HCI. Such various implementations are contemplated by the present disclosure. Furthermore, the memory 603 may be operatively coupled to the processor 601 and processor/controller 613 via the internal communications buses 602 as shown, may be integrated with, or distributed between the processors, or may be some combination of operatively coupled memory and integrated memory.

The public announcement finder 630 may communicate with the host layer 635 in order to connect or pair with a BLE central mode device, or may listen to broadcasts from a BLE peripheral mode device, to obtain public announcements as was described above.

It is to be understood that any of the above described example components in the example mobile device 600, without limitation, may be implemented as software (i.e. executable instructions or executable code) or firmware (or a combination of software and firmware) executing on one or more processors, or using ASICs (application-specific-integrated-circuits), DSPs (digital signal processors), hard-wired circuitry (logic circuitry), state machines, FPGAs (field programmable gate arrays) or combinations thereof. In embodiments in which one or more of these components is implemented as software, or partially in software/firmware, the executable instructions may be stored in the operatively coupled, non-volatile, non-transitory memory 603, and may be accessed by the processor 601, or other processors, as needed.

Figure 7:
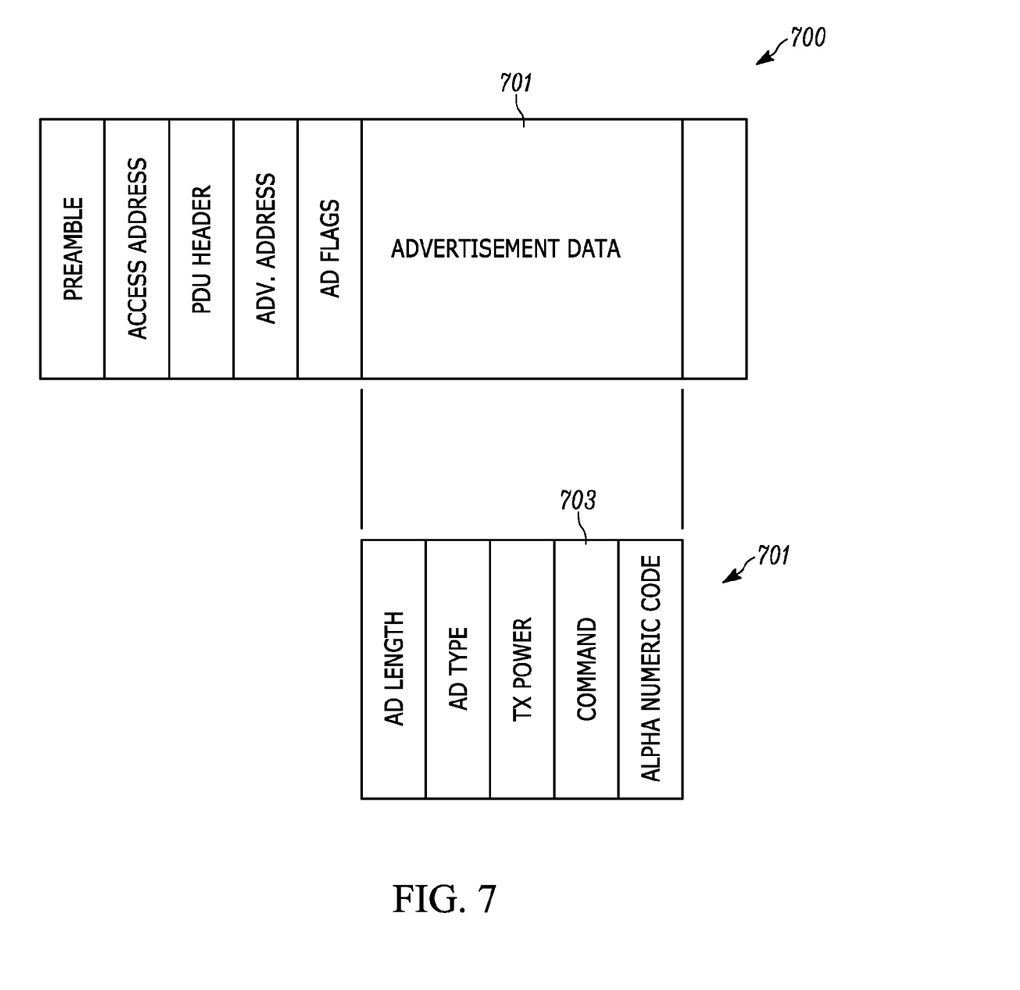
FIG. 7 is a diagram representing an example advertisement packet in accordance with an embodiment.

Turning to FIG. 7, a diagram representation of an advertisement packet 700, in accordance with an embodiment, that is used when communicating with a central mode device is illustrated. The advertisement packet 700 includes a preamble, access address, protocol data unit (PDU) header, advertisement address, flags field, advertisement data 701 field and a cyclic redundancy check (CRC) field. Other fields of the advertisement data 701 include length, type, and transmit power. The command 703 field may include a pairing command and a "scan for public announcements" command in some embodiments, which is used to broadcast a BLE scan request to find BLE devices that are listening to public announcements.

Figure 8:
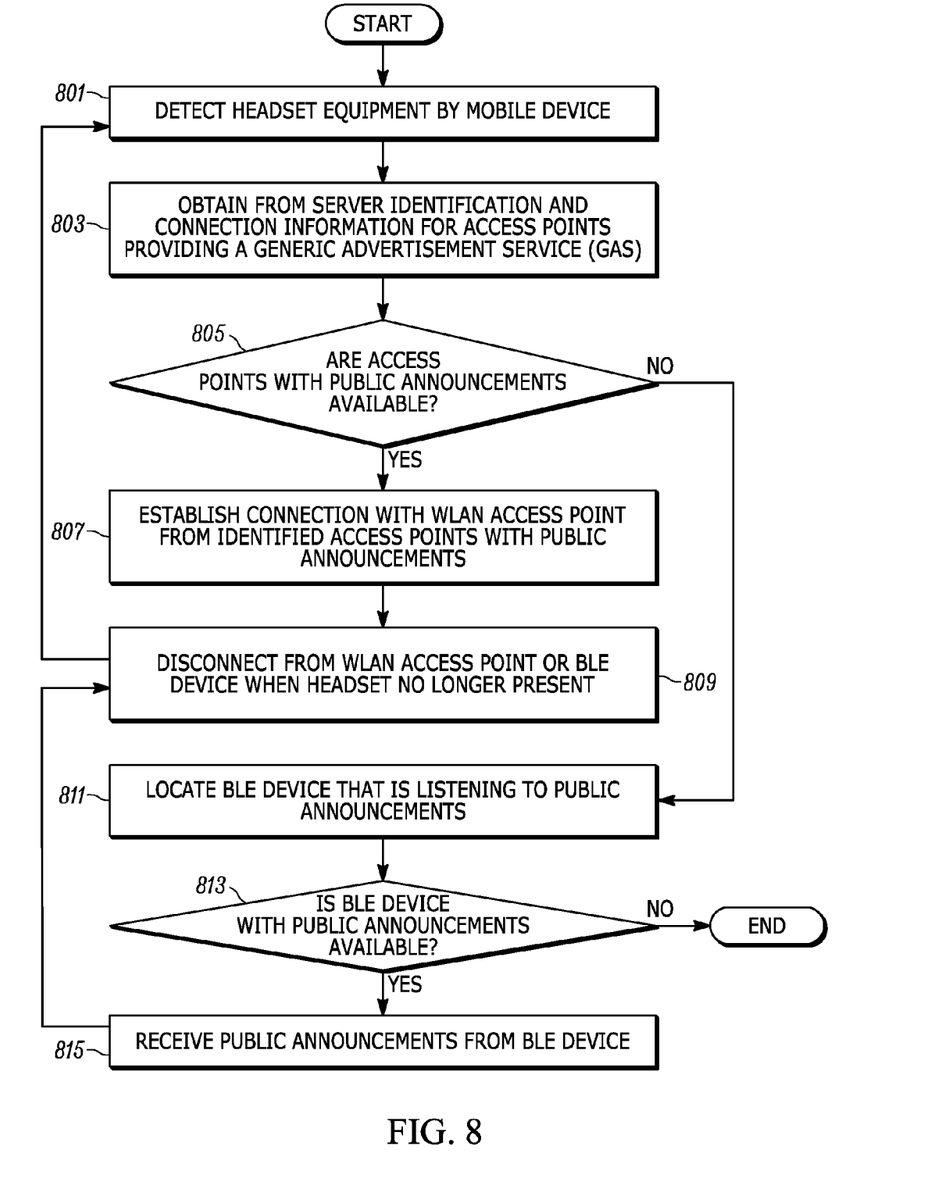
FIG. 8 is a flowchart of a method of operation in a mobile device in accordance with an embodiment.

An example method of operation of a mobile device, such as the mobile device 600, is illustrated in FIG. 8. The method of operation begins and in operation block 801, a mobile device detects that headset equipment is connected. The headset equipment is a headset accessory such as, but not limited to, headphones, earbuds, a single earpiece, etc., which may be connected by wire or wirelessly using for example, Bluetooth®. The headset equipment may or may not include a microphone. In operation block 803, the mobile device communicates with a server to obtain access point identification and connection information for access points providing generic advertisement services (GAS), including a public announcement service, at the location of the mobile device. The identification and connection information include WLAN login credentials required to connect with access points provided in the list. The mobile device location may be determined in a variety of ways, for example by GPS hardware 617 or by obtaining location information from a WAN, WLAN or from the Internet. In some embodiments, the location of the mobile device may be confirmed by the user in response to selection of known previous locations selected from a list shown on the mobile device display. The mobile device may display an inquiry which asks the user to select their current location and, in some embodiments, to confirm if their current location can be used.

In decision block 805, the mobile device will determine whether access points with public announcements are available by attempting to connect to one of the access points using the identification and connection information. If one of the access points with public announcements is available, at operation block 807, a connection is established with the WLAN access point. In operation block 809, the mobile device will disconnect from the WLAN access point when the headset accessory is no longer detected. The process will return to operation block 801 and wait until a headset accessory is once again connected to the mobile device.

If at decision block 805 no access points with public announcements are available then, in operation block 811, the mobile device will locate a BLE device that is transmitting or broadcasting public announcements. The BLE device may be operating in a peripheral mode or in a central mode. In decision block 813, if no BLE device is available the process will terminate. If a BLE device is available in decision block 813, then in operation block 815 the mobile device will receive public announcements from the BLE device. In operation block 809, the mobile device will disconnect from the BLE device when a headset accessory is no longer detected. The process will return to operation block 801 and wait until a headset accessory is connected with the mobile device.

Figure 9:
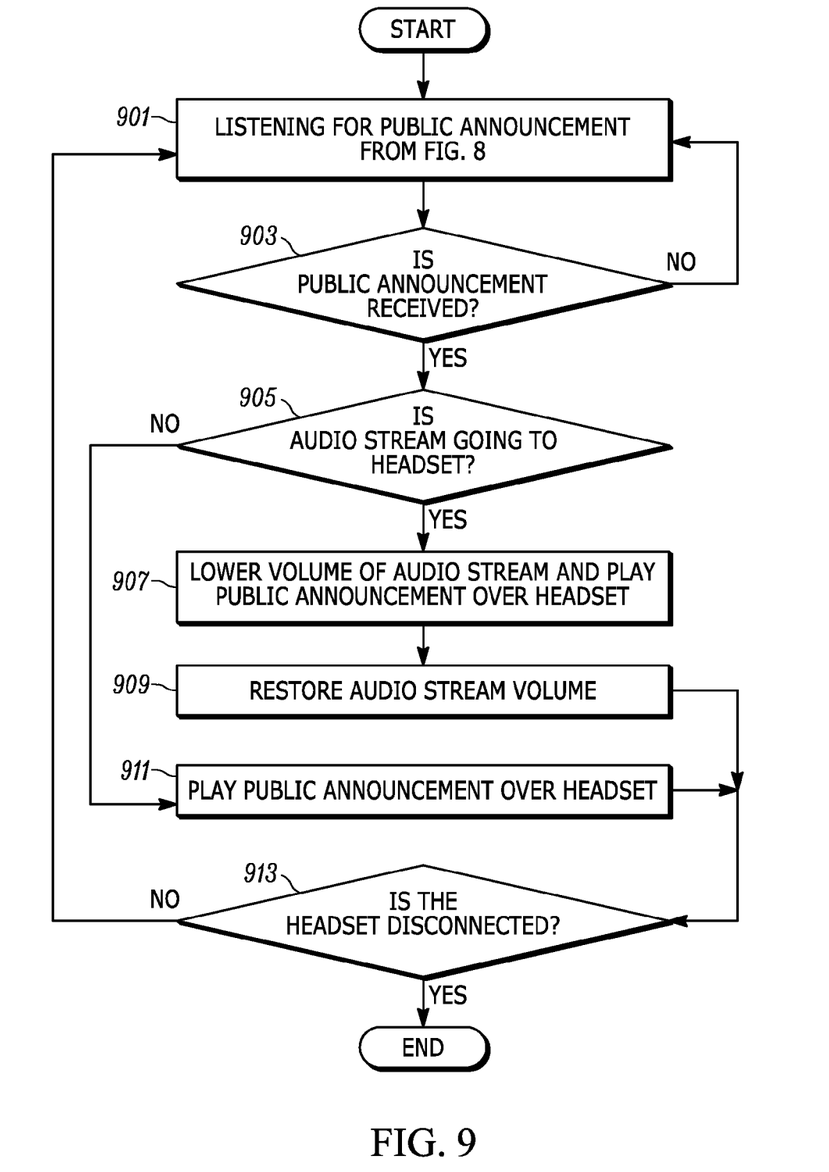
FIG. 9 is flowchart of a method of operation in a mobile device in accordance with an embodiment.

FIG. 9 is a flowchart of another method of operation in a mobile device in accordance with an embodiment. In operation block 901, the mobile device listens for public announcements after connecting with either an access point or a BLE device following the method of operation discussed with respect to FIG. 8. The operation of listening in operation block 901 continues as long as no public announcement is received at decision block 903. If a public announcement is received by the mobile device in decision block 903, then in decision block 905 the mobile device determines if there is an audio stream going to the headset. If no audio stream is going to the headset, then in operation block 911 the mobile device will play the public announcement over the headset. If there is an audio stream going to the headset, then in operation block 907 the audio stream volume will be lowered and the public announcement will be played over the headset at a volume level greater than the audio stream. The public announcement volume will therefore be higher than that of the lowered audio stream such that the user may clearly hear the public announcement. In operation block 909, the original audio stream volume will be restored after the public announcement has concluded. The process returns to operation block 901 and continues to operate until the headset is disconnected in decision block 913. The disconnection of the headset may occur at any point in the process in which case the process terminates.

Figure 10:
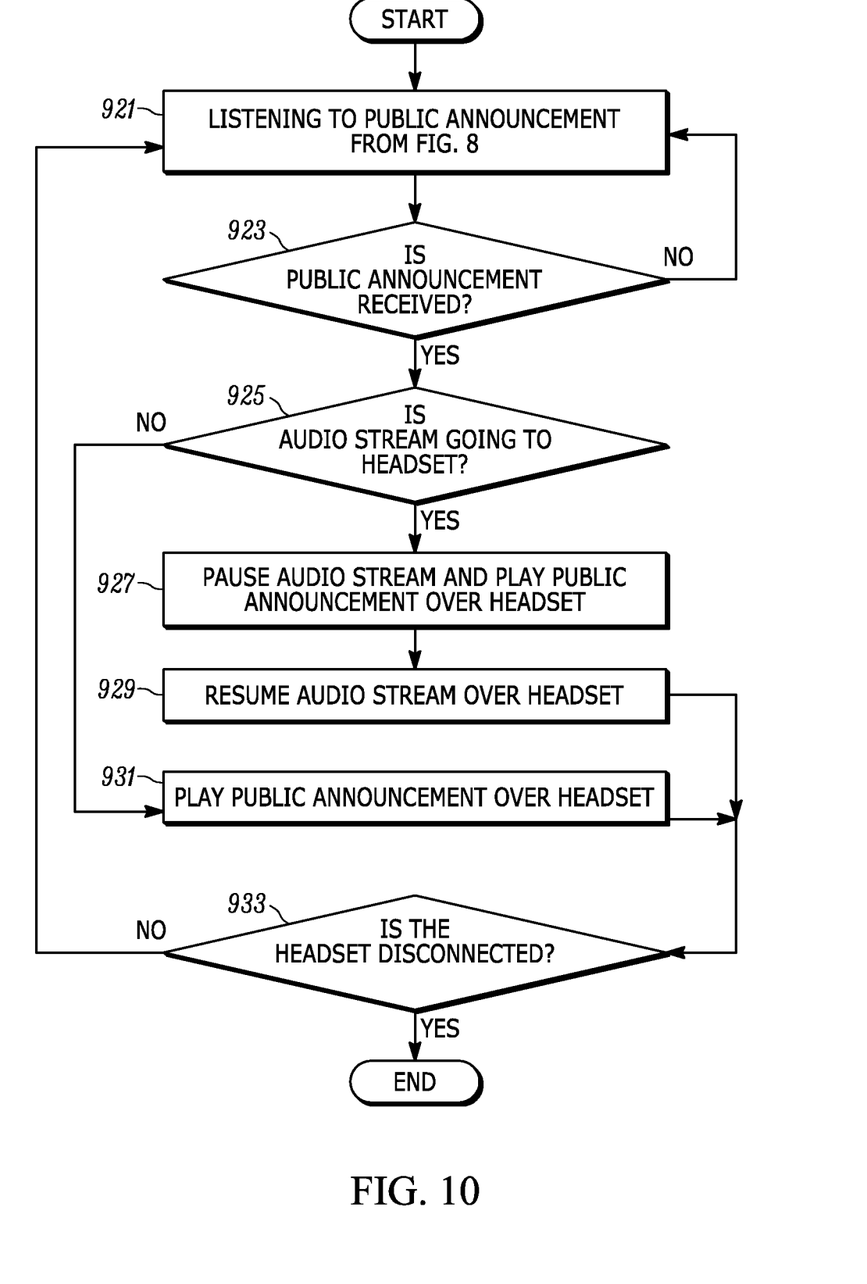
FIG. 10 is a flowchart of a method of operation in a mobile device in accordance with an embodiment.

FIG. 10 is a flowchart of another method of operation in a mobile device in accordance with an embodiment. In operation block 921, the mobile device listens for public announcements after connecting with either an access point or a BLE device following the method of operation discussed with respect to FIG. 8. The operation of listening in operation block 921 continues as long as no public announcement is received at decision block 923. If a public announcement is received by the mobile device in decision block 923, then in decision block 925 the mobile device determines if there is an audio stream going to the headset. If no audio stream is going to the headset, then in operation block 931 the mobile device will play the public announcement over the headset. If there is an audio stream going to the headset, then in operation block 927 the audio stream will be paused while the public announcement is played over the headset.

In operation block 929, playing of the original audio stream will be resumed after the public announcement has concluded. The process returns to operation block 921 and continues to operate until the headset is disconnected in decision block 933. The disconnection of the headset may occur at any point in the process in which case the process terminates.

Figure 11:
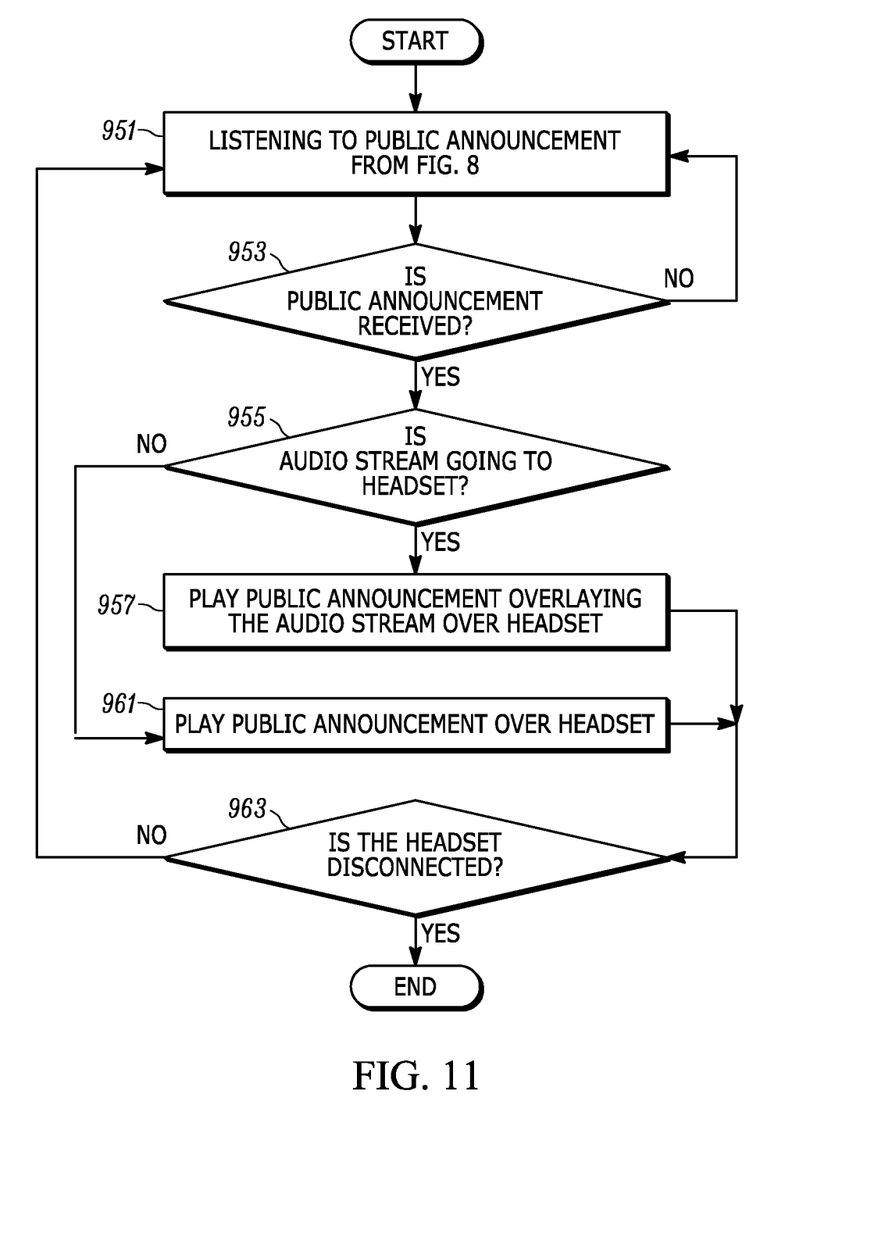
FIG. 11 is a flowchart of a method of operation in a mobile device in accordance with an embodiment.

FIG. 11 is a flowchart of another method of operation in a mobile device in accordance with an embodiment. In operation block 951, the mobile device listens for public announcements after connecting with either an access point or a BLE device following the method of operation discussed with respect to FIG. 8. The operation of listening in operation block 951 continues as long as no public announcement is received at decision block 953. If a public announcement is received by the mobile device in decision block 953, then in decision block 955 the mobile device determines if there is an audio stream going to the headset. If no audio stream is going to the headset, then in operation block 961 the mobile device will play the public announcement over the headset. If there is an audio stream going to the headset, then in operation block 957 the mobile device will play the public announcement over the headset while the audio stream is still playing. In other words the public announcement audio stream will overlay the original audio stream. The public announcement may be played at a volume level equal to or greater than the original audio stream such that the public announcement is clearly audible.

The process returns to operation block 951 and continues to operate until the headset is disconnected in decision block 963. The disconnection of the headset may occur at any point in the process in which case the process terminates.

In FIG. 9, FIG. 10 and FIG. 11, "listening" for public announcements refers to detecting public announcement audio streams received from either a WLAN access point or a BLE device. For example in the mobile device 600, the public announcement finder 630 may receive a public announcement audio stream as one of the command, control and information messages 626 from the WLAN baseband hardware. In the BLE device case, the public announcement finder 630 may receive a public announcement audio stream from the BLE host layer 635 which receives the audio stream over the HCI 628. Therefore listening in these cases requires the public announcement finder 630 to monitor at least on of the command, control and information messages 626 or the HCI 628 to determine when public announcement audio streams are received.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   determining, at a mobile device, that a headset is connected;
   obtaining a list of access points providing a public announcement service based on location of the mobile device in response to determining that a headset is connected, the list of access points including identification and connection information for each access point in the list;
   scanning, by the mobile device, for access points using the access point identification information from the list of access points;
   establishing a connection with an access point found during the scanning; and
   receiving a public announcement via the public announcement service provided by the connected access point; and
   providing an audio stream of the public announcement over the headset.

2. The method of claim 1, wherein obtaining a list of access points, comprises:
   obtaining a list of wireless local area network (WLAN) access points, where the identification and connection information includes an SSID, passkey and security type for each WLAN access point in the list.

3. The method of claim 1, wherein obtaining a list of access points, comprises:
   obtaining a list of access points providing a generic advertisement service (GAS) with public announcements.

4. The method of claim 1, wherein obtaining a list of access points, comprises:
   obtaining a list of low energy wireless protocol devices including identification and connection information for each low energy wireless protocol device in the list.

5. The method of claim 1, further comprising:
   pausing a first audio stream being sent to the headset in response to receiving the public announcement;
   providing a second audio stream of the public announcement over the headset; and
   continuing the first audio stream after completion of the second audio stream.

6. The method of claim 1, further comprising:
   providing a second audio stream of the public announcement over the headset while a first audio stream is playing.

7. The method of claim 6, further comprising:
   providing the second audio stream at a higher volume level than the first audio stream.

8. The method of claim 6, further comprising:
   reducing the volume level of the first audio stream and playing the second audio stream.

9. A mobile device comprising:
   at least one transceiver;
   a processor, operatively coupled to the transceiver and operative to:
      determine that a headset is connected to the mobile device;
      obtain a list of access points providing a public announcement service based on location of the mobile device in response to determining that a headset is connected, the list of access points including identification and connection information for each access point in the list;

scan via the transceiver, for access points using the access point identification information from the list of access points;

establish a connection with an access points found during the scan; and receive a public announcement via the public announcement service provided by the connected access point; and provide an audio stream of the public announcement over the headset.

10. The mobile device of claim 9, wherein the processor is further operative to:

obtain via the transceiver, a list of wireless local area network (WLAN) access points, where the identification and connection information includes an SSID, passkey and security type for each WLAN access point in the list.

11. The mobile device of claim 9, further comprising:

a controller, operatively coupled to the processor, and operative to provide a link layer and a physical layer of a low energy wireless protocol; and wherein the processor is further operative to:

obtain a list of low energy wireless protocol devices including identification and connection information for each low energy wireless protocol device in the list.

12. The mobile device of claim 9, further comprising:

audio equipment, operatively coupled to the processor, the audio equipment operative to provide coupling with an external headset.

13. The mobile device of claim 12, wherein the processor is further operative to:

pause a first audio stream being sent to the headset in response to receiving the public announcement;

provide a second audio stream of the public announcement over the headset; and continue the first audio stream after completion of the second audio stream.

14. The mobile device of claim 12, wherein the processor is further operative to:

provide a second audio stream of the public announcement over the headset while a first audio stream is playing.

15. The mobile device of claim 14, wherein the processor is further operative to:

provide the second audio stream at a higher volume level than the first audio stream.

16. The mobile device of claim 14, wherein the processor is further operative to:

reduce the volume level of the first audio stream and play the second audio stream.

17. The mobile device of claim 12, further comprising:

a headset jack, operatively coupled to the audio equipment.

18. The mobile device of claim 12, further comprising:

a controller operatively coupled to an antenna and to the audio equipment, the controller operative to connect wirelessly with a headset accessory.

19. A system comprising the mobile device of claim 9, and the headset operatively coupled to the mobile device.

* * * * *